US012615398B2

(12) United States Patent
O'Neal et al.

(10) Patent No.: US 12,615,398 B2
(45) Date of Patent: Apr. 28, 2026

(54) CENTRALIZED CONTENT ACCESS MANAGEMENT

(71) Applicant: Viasat, Inc., Carlsbad, CA (US)

(72) Inventors: Stephen O'Neal, Carlsbad, CA (US); Sandeep Moorthy, San Marcos, CA (US); Wesley A. Konderla, College Station, TX (US); Anton Hoffman, San Diego, CA (US)

(73) Assignee: Viasat, Inc., Carlsbad, CA (US)

( * ) Notice: Subject to any disclaimer, the term of this patent is extended or adjusted under 35 U.S.C. 154(b) by 18 days.

(21) Appl. No.: 18/220,714

(22) Filed: Jul. 11, 2023

(65) Prior Publication Data

US 2023/0388559 A1 Nov. 30, 2023

Related U.S. Application Data

(62) Division of application No. 17/413,848, filed as application No. PCT/US2018/066901 on Dec. 20, 2018, now Pat. No. 11,743,511.

(51) Int. Cl.
| | |
|---|---|
| *H04N 21/433* | (2011.01) |
| *H04N 21/214* | (2011.01) |
| *H04N 21/235* | (2011.01) |
| *H04N 21/25* | (2011.01) |
| *H04N 21/254* | (2011.01) |
| *H04N 21/414* | (2011.01) |
| *H04N 21/4627* | (2011.01) |
| *H04N 21/81* | (2011.01) |

(52) U.S. Cl.
CPC ..... *H04N 21/2146* (2013.01); *H04N 21/2353* (2013.01); *H04N 21/41422* (2013.01); *H04N 21/4627* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 10,110,675 B1 | 10/2018 | Millet et al. | |
| 2008/0141314 A1* | 6/2008 | Lemond ............. | H04B 7/18506 725/76 |
| 2008/0222201 A1 | 9/2008 | Chen et al. | |
| 2010/0180308 A1 | 7/2010 | Howcroft et al. | |
| 2010/0305951 A1 | 12/2010 | Ostrowski et al. | |

(Continued)

*Primary Examiner* — Brian T Pendleton
*Assistant Examiner* — Jean D Saint Cyr
(74) *Attorney, Agent, or Firm* — Holland & Hart LLP

(57) ABSTRACT

A media content management server is configured to receive, from a first remote server, first metadata associated with a first set of content items, the first metadata representing a first parameter for each of the first set of content items in a first data format, and further to receive, from a second remote server, second metadata associated with a second set of content items, the second metadata representing a second parameter for each of the second set of content items in a second data format different than the first data format. Reformatted metadata is generated by reformatting the first parameter and the second parameter to a common data format. Rules engine circuitry is configured to generate a data transfer package by comparing the reformatted first and second parameters to content access rule data to determine subsets of content items for inclusion in the data transfer package.

20 Claims, 5 Drawing Sheets

(56) References Cited

U.S. PATENT DOCUMENTS

| | | | |
|---|---|---|---|
| 2016/0286243 A1 | 9/2016 | Easterling et al. | |
| 2018/0020042 A1* | 1/2018 | Couleaud | H04L 67/10 |
| 2018/0034786 A1 | 2/2018 | Srinivasan et al. | |
| 2019/0014371 A1* | 1/2019 | Couleaud | H04N 21/431 |
| 2019/0356713 A1* | 11/2019 | Demange | G06F 16/40 |

* cited by examiner

ON-GROUND ACCESS RULE DATA MANAGEMENT

400

402 — RECEIVE METADATA FROM MEDIA CONTENT SOURCES

404 — REFORMAT METADATA USING ADAPTER(S)

406 — COMPARE REFORMATTED METADATA TO ACCESS RULE DATA TO DETERMINE AUTHORIZED CONTENT ITEMS

408 — COMBINE AUTHORIZED CONTENT ITEMS TO GENERATE DATA TRANSFER PACKAGE

410 — TRANSMIT DATA TRANSFER PACKAGE TO REMOTE VEHICLE SERVER

500          ONBOARD ACCESS RULE DATA MANAGEMENT

502 — DETERMINE 1ST AUTHORIZED CONTENT BASED ON ACCESS RULE DATA

504 — PRESENT 1ST AUTHORIZED CONTENT TO MEDIA PRESENTATION DEVICE(S)

506 — DETERMINE UPDATED VEHICLE STATUS

508 — DETERMINE 2ND AUTHORIZED CONTENT BASED ON UPDATED VEHICLE STATUS AND ACCESS RULE DATA

510 — PRESENT 2ND AUTHORIZED CONTENT TO MEDIA PRESENTATION DEVICE(S)

CENTRALIZED CONTENT ACCESS MANAGEMENT

CROSS REFERENCE

The present Application for Patent is a Divisional of U.S. patent application Ser. No. 17/413,848 by O'Neal et al., entitled "Centralized Content Access Management" filed Jun. 14, 2021, which is a 371 national phase filing of International Patent Application No. PCT/US2018/069901 by O'Neal et al., entitled "Centralized Content Access Management" filed Dec. 20, 2018, which is assigned to the assignee hereof, and expressly incorporated by reference in its entirety herein.

BACKGROUND

The present disclosure relates to communications systems, and more particularly to media content access management. Access to media content can relate to certain content access rules.

SUMMARY

In some implementations, the present disclosure relates to a media content management server comprising a network interface and control circuitry configured to receive, from a first remote server, first metadata associated with a first set of content items, the first metadata representing a first parameter for each of the first set of content items in a first data format. The control circuitry is further configured to receive, from a second remote server, second metadata associated with a second set of content items, the second metadata representing a second parameter for each of the second set of content items in a second data format different than the first data format. The control circuitry is further configured to generate reformatted metadata at least in part by reformatting the first parameter of the first metadata from the first data format to a third data format using first adapter circuitry, and reformatting the second parameter of the second metadata from the second data format to the third data format using second adapter circuitry. The server further comprises rules engine circuitry configured to generate a data transfer package for a vehicle at least in part by comparing the reformatted first parameter of the reformatted metadata to content access rule data to determine a subset of the first set of content items that is authorized for the vehicle, comparing the reformatted second parameter of the reformatted metadata to the content access rule data to determine a subset of the second set of content items that is authorized for the vehicle, and combining at least a portion of the subset of the first set of content items and at least a portion of the subset of the second set of content items to generate the data transfer package.

In some embodiments, the control circuitry is further configured to transfer, using the network interface, the data transfer package to a remote server associated with the vehicle. The control circuitry may be further configured to receive, from the vehicle, an indication of a status change associated with the vehicle, wherein transferring the data transfer package is performed in response to the status change.

The data transfer package may include at least a portion of the content access rule data. In some embodiments, the first parameter and the second parameter are of the same type. The control circuitry can be further configured to receive, from a third remote server, at least a portion of the content access rule data. In some embodiments, the data transfer package is an update package. The control circuitry can be further configured to compare the subset of the first set of content items and the subset of the second content items with a list of content items already stored on the vehicle.

In some embodiments, the media content management server further comprises non-volatile data storage media storing a media content library comprising the first and second sets of content items, service offering content items, and the content access rule data. The data transfer package may include at least some of the service offering content items. In some embodiments, the data transfer package includes content items for a plurality of different content types. Each of the first set of content items and the second set of content items may comprise one or more of the following: on-demand video content, broadcast television content, and advertisement content.

The control circuitry can be further configured to receive, using the network interface, the first set of content items from the first remote server, and receive, using the network interface, the second set of content items from the second remote server. In some embodiments, the content access rule data indicates a plurality of rules attributes associated with content access authorization, the plurality of rules attributes being associated with the first parameter and the second parameter. For example, the plurality of rules attributes may indicate content access authorization based on two or more of: a content item authorization start time, a content item authorization end time, a content item identifier, a vehicle identifier, a trip origin identifier, a trip destination identifier, a vehicle fleet identifier, and a rule priority.

In some embodiments, the first set of metadata comprises a set of key-value pairs associated with each of a plurality of the first set of content items. The control circuitry can be further configured to generate portal graphical interface data based on a vehicle identifier associated with the vehicle and the content access rule data, wherein the transfer package comprises the portal graphical interface data. In some embodiments, the first metadata includes first rule data related to the first set of content items, the first rule data comprises one or more of authorization start time, authorization end time, and authorization geography data, and the content rule data includes the first rule data.

In some implementations, the present disclosure relates to a content presentation system for a vehicle. The content presentation system comprises non-volatile data storage media configured to store a media content library and content access rule data, a network interface, and an onboard media management server. The onboard media management server comprises control circuitry configured to determine a first subset of the media content library that is authorized for presentation based on the content access rule data and a status associated with the vehicle, present the first subset of the media content library to one or more media presentation devices disposed onboard the vehicle, determine an updated status associated with the vehicle, in response to the updated status, determine a second subset of the media content library that is authorized for presentation based on the updated status, the second subset of the media content library being different, at least in part, from the first subset of the media content library, and present the second subset of the media content library to the one or more media presentation devices.

Determining the second subset of the media content library may be performed off-line. The control circuitry can be further configured to, in response to the updated status, establish a connection with a remote server using the network interface, receive updated content access rule data from the remote server using the network interface, and store the updated content access rule data in the non-volatile data storage media, wherein the second subset of the media content library is based at least in part on the updated content access rule data.

In some embodiments, the control circuitry is further configured to, in response to the updated status, establish a connection with a remote server using the network interface, receive updated media content from the remote server using the network interface, and store the updated media content in the non-volatile data storage media as part of the media content library, wherein the second subset of the media content library comprises at least a portion of the updated media content. In some embodiments, the control circuitry is further configured to generate portal graphical interface data representing the second subset of the media content library, and presenting the second subset of the media content library comprises providing the portal graphical interface data to the one or more media presentation devices. In some embodiments, the content access rule data indicates one or more parameters associated with each of a plurality of content items, and the updated status is associated with the one or more parameters.

In some implementations, the present disclosure relates to a method of managing media content on a vehicle. The method comprises, by control circuitry of an on-ground media server, receiving, from a first remote server, a first data structure comprising first metadata having a first data format, the first metadata comprising a first parameter value associated with a first content item of a first type, and reformatting the first metadata to a common data format using first adapter circuitry. The method further comprises receiving, from a second remote server, a second data structure comprising second metadata having a second data format, the second metadata comprising a second parameter value associated with a second content item of a second type different than the first type, and reformatting the second metadata to the common data format using second adapter circuitry. The method further comprises generating a combined metadata data structure including the reformatted first metadata and the reformatted second metadata. The first parameter value and the second parameter value are of a same type of parameter. In some embodiments, the method further comprises determining a subset of content items of a content item library that are accessible based on the combined metadata data structure and content access rule data, and generating a data transfer package including the subset of content items and one or more of the combined metadata data structure and the content access rule data.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

Figure 1:
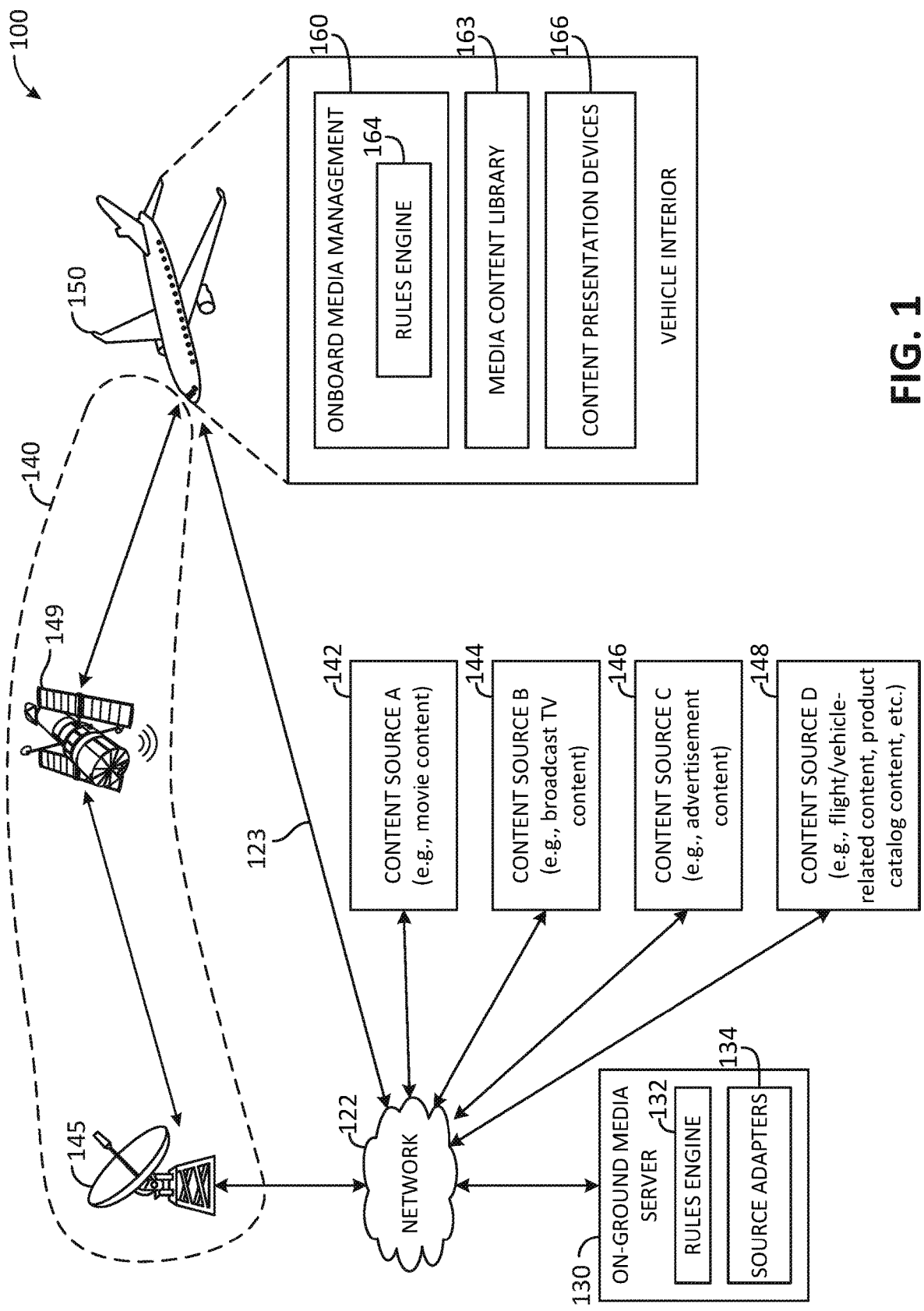
FIG. 1 illustrates a system for managing content access rule data in accordance with one or more embodiments.

The headings provided herein are for convenience only and do not necessarily affect the scope or meaning of the claimed invention. In certain implementations, the present disclosure relates to systems, devices and methods for managing and/or transferring content access rule data and/or media content items to onboard media management systems of vehicles.

The present disclosure provides devices, systems, and processes for centralized and/or unified media content transfer and access management. Generally, media content items may be packaged and transferred to media management servers of mobile platforms. Access to, or authorization for presentation of, the respective media content items may be based on content access rule data associated therewith. Such media content access rule data may be resolved locally by the media management server of the mobile platform and/or may be resolved by a remote (e.g., on-ground) media server, wherein the selection of content items transferred to the mobile platform by the remote media server may reflect resolution of content access rules at the remote media server.

Media content items for presentation on a vehicle or other mobile platform can originate from disparate remote sources, such as remote content servers. For vehicle onboard content presentation platforms, or other mobile platforms, server(s) may be locally installed, wherein such server(s) receive the content for presentation as one or more data transfer packages from one or more remote media servers. For example, an onboard media management server may be configured to pull in various content services and solutions together to provide a desirable end user experience for passengers onboard the vehicle or other mobile platform. Different types of content items for presentation onboard a vehicle or other mobile platform may include, for example, on-demand video or text content (e.g., in-flight entertainment), broadcast television or other broadcast content, product catalog information, or other types of content. Such content items may be received from one or more on-ground media servers, which in turn may receive the different types of content items from different content sources.

The presentation of content items to end-users on a vehicle or other mobile platform may be governed by content access rules data, which may indicate conditions under which various content items are authorized or intended to be presented. The process(es) or functionality associated with determining whether one or more content items are authorized or intended for presentation according to associated access rule data may be referred to herein in certain contexts as "access rule resolution." Access rule resolution may be a mechanism utilized to select and/or compile content items for delivery to mobile platforms, and/or to manage access to such content items locally at mobile platforms. Access rule resolution functionality may be implemented by remote on-ground server control circuitry and/or onboard (e.g., in-air) media management circuitry. Content access rule data may comprise data indicating conditions in which content items and/or groups of content items are authorized or intended for presentation. Content access rule data may additionally or alternatively indicate content parameters and/or mobile platform status parameters that are associated with content accessibility or inaccessibility, either individually or in combination. Such content access rule data may be embodied in any suitable or desirable type of data structure or data structures. Generally, content access rule data may comprise sets of key-value pairs associating particular content items and/or groups of content items with various content parameters and/or mobile platform status parameters relevant to content access rules. In accordance with embodiments of the present disclosure, an onboard or on-ground server may comprise control circuitry configured to implement access rule resolution in order to evaluate content access rules configured by/for one or more entities (e.g., customers, airlines, etc.), and determine which content items and/or groups of content items are meant to be accessibly by, or authorized for, access by passengers on the particular mobile platform and/or at particular point(s) in time.

Content parameters that may be embodied in content access rule data can include, but are not limited to, content accessibility/availability start time, end time, or other time or date range, vehicle, trip origin, trip destination, end user/audience demographic attributes, location (e.g., current location), or the like, which may be evaluated to select which content items and/or group of content items can be presented at a given point in time. Metadata on which content access rule data is based may associate each content item and/or group of content items with a value for each of one or more types of content parameters. For example, a title or other identifier associated with the content item may be coupled with a value relating to each of one or more types of parameters. Furthermore, various parameters or rules may be associated with a priority metric, which may influence resolution of such rule(s) relative to other rule(s). The term "content parameter" refers to any value or data indicating a characteristic or attribute about a content item and/or group of content items. Example content parameters can include, but are not limited to, values or data indicating a content title, genre, access start data/time, access end data/time, actors, target demographic, or other type of parameter. The term "mobile platform status parameter" refers to any value or data indicating a characteristic or attribute about a status or condition relating to a mobile platform. Mobile platform status parameters can be obtained in any suitable or desirable way, such as using one or more data busses of the relevant mobile platform (e.g., aircraft data bus).

Example mobile platform content parameters can include, but are not limited to, values or data indicating a physical location, mobile platform identifier, mobile platform grouping identifier, trip route, trip origin, trip destination, current time, or other type of parameter. Parameters, whether content parameters or mobile platform status parameters, may generally comprise key-value pairs, wherein the key is parameter type and the value is the parameter value (e.g., for a content parameter "Genre:Drama," the key, "Genre," is the parameter type, referring to the genre of the relevant content item or group of content items, whereas the value, "Drama," is the parameter value, indicating the particular genre value for a content item or group of content items; an example mobile platform status parameter may be "Destination:Las Vegas"). The term "parameter," as used herein, may refer to a parameter type, a parameter value, or a parameter type-value pair, depending on context, as will be apparent in the description below. Furthermore, the term "parameter," as used herein, may refer to a content parameter or a mobile platform status parameter, depending on context, as will be apparent in the description below.

In some implementations, the present disclosure provides an advantageous solution for generating unified/reformatted content access rule data having of a common data format from metadata and/or parameters received from disparate remote content sources represented in non-uniform data format.

Media Content Management System

In some implementations, the present disclosure provides systems, processes, and devices that provide for remotely and/or automatically managing access and/or updates to media content libraries and/or associated content access rule data stored in a vehicle media system using a centralized media management server. FIG. 1 illustrates a system 100 for managing content access rule data and content transfer package generation and transmission to a mobile platform 150, such as a vehicle, in accordance with one or more embodiments.

The system 100 includes an onboard media management system 160, which may be installed in, and/or disposed on or in, a mobile platform 150, such as an aircraft, cruise ship, automobile, or other vehicle or the like. Although certain embodiments are disclosed herein in the context of aircraft, or other vehicles, it should be understood that the principles disclosed herein may be applicable to any suitable or desirable mobile platform or vehicle. The onboard media management system 160 may be configured to provide access to a subset of a locally-stored media content library 163 based on resolution of certain content access rules. With respect to aircraft-based embodiments, the media content library 163 may comprise, in-flight entertainment to passengers onboard the aircraft.

With further reference to FIG. 1, the system 100 may provide for the periodic or sporadic updating of the onboard media content library 163 associated with the mobile platform 150 through transmission to, and/or installation on, the mobile platform 150 of a data transfer package. For example, in certain embodiments, the updating/transmission of an onboard media content library is performed at least in part over a network connection external to the vehicle 150, such as through a satellite network connection 140 and/or another type of network connection 123 with the Internet or other network 122 (e.g., Wi-Fi or other network connection). The gateway 145 may be in data communication with the satellite 149 as well as to the network 122, and thereby to the on-ground media server 130. The mobile platform 150 may be configured to receive a forward downlink signal from the satellite access network 140 including the satellite 149 and gateway 145, and to transmit a return uplink signal to the satellite-based access network 140 using the satellite 149 and the gateway 145.

Aircraft and other vehicles often store media content libraries for the purpose of providing entertainment and/or other content or resources for passengers. Generally, media content stored on a vehicle, such as an aircraft, may be subject to periodic content updating processes. For example, such processes may be implemented weekly, monthly, quarterly, or according to some other schedule. In some implementations, when an onboard media content library maintained in a vehicle becomes expired, or replacement thereof is desired for some reason, the onboard media content library may be replaced or updated, at least in part, through transmission/provision of a data transfer package comprising the new content. For example, with respect to updating media content and/or associated content access rule data, the onboard media content library 163 may be replaced with an entirely new catalog, where the new content has some overlap with the previously-stored content, only updated content may be provided.

The updating of media content on a vehicle may be implemented using various types of digital content transfer, such as directly to the vehicle over a communication network (e.g., Internet connection via satellite or other wireless hardware and/or communication protocol), or through physical media exchange. For example, one or more data storage drives storing a data transfer package comprising media content may be physically removed and swapped or exchanged with one or more substitute data storage drives or media devices.

The use of media content on mobile platforms may be governed at least in part by certain media license or access rules, which may govern, at least in part, the rights to access the media content or the conditions under which access to the media content is desirable or intended. The terms "access rules," "access rule data," "content access rules," and "content access rule data" may refer to any data structure(s) identifying or indicating whether a given media content item or group of content items is designated as accessible or inaccessible, as described in more detail below. Such access rules may be for a particular term or period of time and may indicate the conditions under which particular content items may be viewed and/or accessed in accordance with the relevant license agreement(s) or other considerations. In some implementations, access rules indicate, such as on a monthly basis, that certain media content items will become active at a certain point in time, whereas certain other media content items may become inactive at such point in time.

"Accessible" media content stored in an onboard media content library of a mobile platform may be made visible to passengers under certain conditions. The term "accessible" refers to media content that is available for selection, distribution or presentation to passengers/end users of a mobile platform at a given time. For example, accessible media content items may be content that is licensed or otherwise permitted for distribution or presentation to passengers of a vehicle by the media system of the vehicle. Furthermore, accessible media content items may include media content that is public domain content, or other freely-accessible content not requiring specific license or authorization. Similarly, the term "inaccessible" may be used to refer to media content or content items that are not designated or authorized for presentation at a given time. For example, inaccessible content may be content that is not licensed or authorized at a given time, and therefore access to such content may be restricted at least in part.

The network 122 can be any type of network and can include, for example, one or more of: The Internet, an IP network, an intranet, a wide area network (WAN), local area network (LAN), a virtual private network (VPN), a virtual LAN (VLAN), a fiber optic network, a cable network, a public switched telephone network (PSTN), a public switched data network (PSDN), a public land mobile network, a cellular network, and/or any other type of network supporting communication as described herein. Furthermore, the network 122 can include both wired (e.g., copper and optical) and wireless (e.g., radio and microwave) connections.

The system 100 further comprises an on-ground media server 130 that is configured to remotely manage the transferring of media content data transfer packages in accordance with embodiments of the present disclosure. For example, the on-ground media server 130 may implement data transfer package transmission over the network 122. The transfer of media content between the on-ground server 130 and the mobile platform 150 is described in further detail with respect to the system 200 of FIG. 2. The on-ground media server 130 may receive various types of media content items from various content sources. Examples of types of content and content sources includes but is not limited to non-linear media content (e.g., video on demand, from Content Source A 142), which may be available on-demand to media presentation devices at the mobile platform 150 to the extent that such content is accessible. The media server 130 may further receive linear media content items (e.g., linear audio and/or video media, from Content Source B), such as content items that are scheduled for delivery/consumption at a certain time (e.g., a television show run at a set time, live broadcasting, etc.). For example, various broadcast television channel offerings may be provided by the on-ground media server 130 to the mobile platform 150.

The system 100 is configured to implement unified content item transmission and presentation management in accordance with embodiments disclosed herein. The system 100 may further advantageously allow for implementation of rules resolution functionality onboard a vehicle or other mobile platform 150 using content access rule data (e.g., as implemented by rules engine circuitry 164), whether the vehicle or mobile platform 150 is communicatively connected with the on-ground media server 130 or off-line. Onboard rules resolution on the mobile platform 150 may govern, at least in part, how content items are presented to content presentation devices 166 associated with the mobile platform 150. Furthermore, embodiments of the present disclosure advantageously provide solutions for implementing rules resolution functionality at the on-ground remote server 130, wherein such rules resolution may govern what content is transmitted from the on-ground media server 130 to the mobile platform 150 as part of one or more data transfer packages.

The on-ground media server 130 includes rules engine circuitry 132 configured to resolve content access rule data in order to generate data transfer packages for the onboard media management server 160 of the mobile platform 150. In some embodiments, the mobile platform 150 further comprises rules engine circuitry 164 for resolving content access rule data locally at the mobile platform 150. The rules engine circuitry 132 and/or the rules engine circuitry 164 of the system 100 may provide a desirable end user experience for passengers at or onboard the mobile platform 150 (e.g., airplane).

The on-ground server 130 can provide accessible content items, or content items that may be accessible under certain conditions, as part of data transfer package(s) transmitted to the mobile platform 150 over the network(s) 122, 140. Content items may be synchronized or transferred to the mobile platform 150 using various mechanisms. Unlike mere transferring of content items to the mobile platform 150, synchronizing data to the mobile platform 150 may involve determining content items that are stored and/or not stored currently at the mobile platform 150. For example, data may be transfer between the mobile platform 150 and the on-ground server 130 indicating current content items stored at the mobile platform 150, wherein such data may be relied upon to determine a set of content items to be transferred in a data transfer package to the mobile platform 150 from the on-ground media server 130. In embodiments in which content items are synchronized with, or otherwise transferred to, the mobile platform 150 for local storage thereof, such content may be available on the mobile platform for presentation even when the mobile platform 150 is not communicatively coupled to the on-ground media server (e.g., the mobile platform 150 is off-line). Furthermore, content access rule data may be synchronized and/or transferred from the on-ground media server 130 to the mobile platform 150, such that off-line rule resolution functionality may be implemented locally at the mobile platform 150, with or without connectivity with the on-ground media server 130. For example, the mobile platform 150 may presently be positioned in an area where network coverage via the satellite 149 or other network hardware is unavailable. In such situations, embodiments of the present disclosure advantageously allow for uninterrupted content presentation and/or rule resolution at the mobile platform 150 during breaks in network coverage.

The content access rule data utilized by the on-ground media server 130 can be obtained by the on-ground media server 130 from any source or entity. For example, with respect to airplane mobile platforms, the on-ground media server 130 may receive content access rule data from one or more airline entities, wherein such airlines provide content access rule data governing content presentation on one or more airplanes associated with the airline.

The on-ground media server 130 may be configured to receive metadata relating to various content items and/or content access rule data relating to various content items from separate sources (142, 144, 146, 148), wherein the on-ground media server 130 is configured with source adapter circuitry 134 that serves to aggregate content item metadata and/or content access rule data from different sources.

Content access rule data and/or metadata associated with various content items may relate to trip origin and/or destination information, mobile platform affiliation information (e.g., airline information), mobile platform grouping affiliation (e.g., airline fleet information), trip route information associated with the mobile platform 150, and/or other parameters. For example, with respect to a trip of an airplane or other mobile platform, it may be desirable for content items associated with the particular trip to be presented to passengers thereon. For example, as an example use case, it may be desirable for advertisements for Las Vegas attractions to be presented to passengers on a flight to Las Vegas. Furthermore, certain destinations, origins, or routes may be associated with certain constraints with respect to content item presentation. For example, where broadcast television is provided onboard an airplane or other mobile platform, such broadcast signals may be unavailable in certain geographic areas. Content access rule data may resolve to indicate that such content is inaccessible when the relevant mobile platform is in a restricted or outage area.

Content access rule data may direct or control at least in part what content items are transferred from the on-ground media server 130 to a given mobile platform. Furthermore, in some embodiments, content access rule data relates to the management of how such content items are transferred onto the mobile platform 150.

As referenced above, the on-ground media server 130 may be configured to pull in various services and/or solutions together from a variety of content sources (e.g., 142, 144, 146, 148). In embodiments in which the on-ground media server 130 receives metadata and/or content access rule data associated with one or more content items from disparate content sources, it may be desirable for such metadata and/or content access rule data to be reformatted and/or combined in such a way as to allow for central management thereof by the on-ground server 130. For example, metadata and/or content access rule data may be received over the network 122 from one or more of a content source 142 ("Content Source A") providing metadata, content access rule data, and/or content item data associated with movie content and/or other on-demand content; a content source 144 ("Content Source B") providing metadata, content access rule data, and/or content item data associated with broadcast television or radio source content; a content source 146 ("Content Source C") providing metadata, content access rule data, and/or content item data associated with advertisement content; and/or a content source 148 ("Content Source D") providing metadata, content access rule data, and/or content item data associated with mobile-platform-related (e.g. flight-, or vehicle-related) content, and/or product catalog content, or the like. Content items related to the mobile platform 150 may include origin/destination information, user experience information, workflow information, map data, product service offerings data and/or other types of data relating to the mobile platform 150 and/or a trip associated therewith. For example, product catalog content items may indicate or relate to catalog items for purchase, such as media content item access and/or connectivity services. Such services may be purchased or provided for specified prices and/or periods of time, such as for an hour or other duration. With respect to broadcast television or radio content items, such content items may be provided in transcoded formats, and/or metadata may be provided allowing for local transcoding of the content at the on-ground media server.

The mobile platform 150 is illustrated in FIG. 1 as an airplane, and certain embodiments are disclosed herein in the context of airplanes, fleets of airplanes, and/or airlines. However, it should be understood that embodiments of the present disclosure are applicable to other types and/or groupings of mobile platforms, and/or associated entities.

The mobile platform 150 may be configured to provide a mechanism to synchronize content access rule data with content access rule data maintained by the remote on-ground media server 130 to allow for local resolution of access rules onboard the mobile platform 150. That is, the system 100 may provide a solution to enable centralized metadata and/or content access rule data generated and/or maintained at the on-grounds media server 130 to be synchronized with the remote mobile platform 150 such that the mobile platform 150 can resolve content access rules and provide access to content items associated therewith, whether online or off-line. That is, the onboard media management server 160 may receive content access rule data from the on-ground media server 130 and apply the same set of content access rule data onboard the mobile platform 150 as is applied at the on-ground server 130, thereby allowing for off-line onboard rules resolution at the mobile platform 150.

As described above, with respect to the mobile platform 150, the on-ground server 130 may represent a remote media server. Although referred to herein as an on-ground server, the media server 130 may be physically disposed and/or situated in any physical location; use of the term "on-ground" herein is for simplicity and convenience to indicate that the media server 130 is not disposed on or at the mobile platform 150, but rather external thereto at some location. The on-ground media server 130 may be understood with respect to the on-ground media server 230 of FIG. 2, which may constitute an example embodiment of the on-ground media server 130 of FIG. 1. With respect to FIG. 1, media content items and/or content access rule data can be obtained by the mobile platform from the on-ground content server 130 via the network 122 and/or the on-ground terminal 145 or other terrestrial stations, gateways, or other network nodes, or the like.

Figure 2:
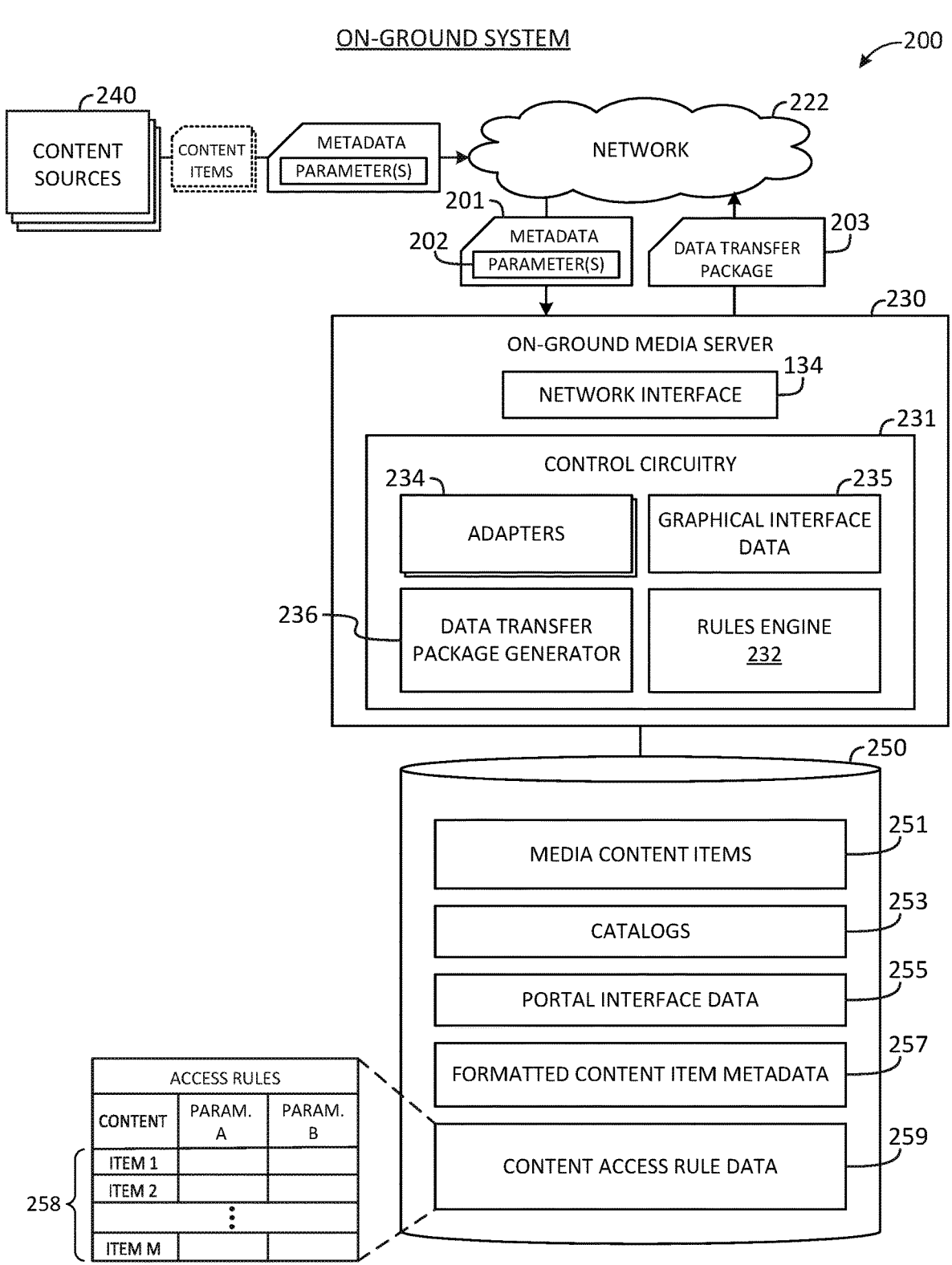
FIG. 2 illustrates an on-ground management system in accordance with one or more embodiments.

With reference to FIG. 2, the on-ground media server 230 may comprise control circuitry 231, which may be used to determine or acquire information relating to what media content of the on-ground content library 251 is to be added to a particular mobile platform (e.g., the mobile platform 150 of the system 100 described above).

The control circuitry 231 (e.g., the data transfer package generator and/or rules engine 232 circuitry) of the on-ground media server 230 may be configured to determine a subset of the media content items 251 that is associated with a particular mobile platform (e.g., vehicle or aircraft) based on content access rule data 259. That is, the data transfer package 203 may represent a subset of the media content items 251 that is accessible or authorized for transfer to one or more mobile platforms, as indicated by the content access rule data 259. For airplane mobile platform embodiments, the parameters of the content access rule data 259 may be directed by an airline associated with the airplane mobile platform. With respect to one or more media content items of the media content 251, no license may be required for use or presentation thereof. For example, some content may be free, or open-source, content that is not subject to licensing rules. Such free access to the content may be indicated by the content access rule data 259. Although the data transfer package 203 is described as being a subset of the media content 251, in some embodiments, the media content that is transferred in the data transfer package 203 may comprise the entire media content library 251.

The network 222 may comprise a wide area network, such as the Internet, which may be accessed by a mobile platform via a satellite communication network. Therefore, the communication link between the on-ground media server 230 and a remote mobile platform may be achieved over the Internet or other wide area network. In some embodiments, transmission of the data transfer package 203 to a mobile platform via an external communication link, such as a satellite network connection, may compete with other data transfer needs of the mobile platform served by such network, which may prevent or impede and acceptable user experience from being provided. For example, such other data transfer needs may involve requests for data from passengers currently onboard the vehicle or aircraft. In certain embodiments, the on-ground media server 230 may be configured to implement the transmission of the data transfer package 203 to a mobile platform during a period of time in which the network used by the mobile platform has sufficient or unused network capacity or bandwidth, thereby improving efficiency and/or utilization of available resources. Furthermore, in some implementations, the data transfer package 203 may be transmitted from the on-ground media server 130 to the relevant mobile platform using a "trickle" data transfer process or capability, which may utilize unused capacity of a network when such capacity may otherwise be idle, and therefore the impact on network bandwidth may be negligible or reduced. For example, a trickle transfer process may be implemented that transfers data only when capacity is available after all other traffic has been transmitted. In such a case, the transmission of the data transfer package 203 may be a lower priority than other traffic delivered via a wireless communication link or other network connection. In contrast, the real-time transfer of media content items via a network communication may be according to a higher priority than the data transfer package.

The system 200 of FIG. 2 may provide a centralized ground-based system for managing the distribution of a variety of different types of content items to the mobile platform 150. In some solutions, metadata and/or content access rule data associated with different types of content items may be handled and/or synchronized separately through separate on-ground media servers or systems. For example, on-demand video content may be managed by a separate on-ground server than broadcast television content or other types of content items. Generally, the implementation of multiple management points/servers to manage the transfer of content item data and/or associated metadata and rule access data can results in undesirable complexity or user experience. For example, such systems may not provide a unified experience for management entities tasked with managing the various types of data. Certain embodiments of the present disclosure advantageously provide for centralized management of content items and associated metadata and content access rule data in a single on-ground media server 230 utilizing source adapter circuitry 234 for conforming or combining different formats of metadata and/or content access rule data in a single common/uniform data format.

As referenced above in connection with the system 100 of FIG. 1, embodiments of the present disclosure may provide for the unified distribution of content items from disparate content sources and transmission of such content items and/or associated content access rule data in one or more data transfer packages. In some embodiments, the on-ground media server 230 may receive metadata 201 associated with one or more content items from different content sources 240. Such metadata may include various content parameters relating to content access rules associated with the content items. In some embodiments, the content sources 240 further provide the content items themselves to the on-ground media server 230 via the network 222. In some embodiments, the metadata provided by the content sources 240 includes content access rule data associated with the relevant content items. The on-ground media server 230 may store the media content items received from various content sources in data storage 250, which may comprise one or more magnetic, optical, solid-state, and/or other types of data storage media. The on-ground media server 230 may further utilize the control circuitry 231, and in particular the adapter circuitry 234 and rules engine circuitry 232, to provide a unified ground-based system to manage distribution of a variety of types of content items and associated content access rule data and/or metadata to a single mobile platform and/or server associated therewith.

The adapters 234 of the control circuitry 231 may be used to standardize metadata of different data formats received from the content sources 240 in to a common unified data format to allow for simplified application of content access rule data thereto by the rules engine circuitry 232. The adapters 234 may comprise separate adapter circuitry or functionality for each of a plurality of content sources. That is, the adapters 234 may comprise source-specific adapter circuitry for each of a plurality of content sources. The data transfer package generator circuitry 236 may use the rules engine circuitry 232 to identify a set of the media content items 251 for inclusion in the data transfer package 203 for delivery to a mobile platform (not shown).

The metadata 201 may include content parameter types that are common across different types of content items received from different content sources (e.g., parameter type "genre" may be a common parameter type for on-demand and broadcast media types of content items, which may be received from different content sources, respectively). The adapter circuitry 234 may be configured to standardize such parameters (e.g. standardize the parameter values associated with content items from different sources through source-specific adapters or re-factoring) to provide for maintenance of metadata associated with a variety of content items in a common data format. Therefore, the system 200 may allow for the consistent incorporation of content items sourced from a variety of content sources 240 into a single package or framework. In some embodiments, the content sources 240 may provide data indicating groupings of content items together, wherein groupings of content items comprise a set of content items and/or associated metadata that are intended to have content access rule data applied thereto collectively or have a consistent access rule resolution. That is, the content access rule data or rules may be applied to a group of content items, such that rule resolution for the content items is the same within the group. Groupings of content items may be made by the content sources 240 and/or the on-ground media server 230. For example, the control circuitry 231 of the on-ground media server 230 may be configured to identify content items having similar parameters (e.g., similar parameter values for a particular type of parameter) and group such content items together to provide simplified rules resolution.

As a clarifying example, the adapter circuitry 234 may receive first metadata from a first content source of the content sources 240 and second metadata from a second content source of the content sources 240. The received first metadata and second metadata each may comprise a superset of content parameters and associated parameter values, wherein a subset thereof relates to the content access rule data 259. In some embodiments, the adapter circuitry 234 may be configured to parse the first metadata and second metadata to identify the subsets thereof relating to the content access rule data 259. For example, the adapter circuitry may effectively strip-out or remove the portions of the first metadata and second metadata that do not relate to the content access rule data 259, or to a relevant portion thereof. The adapter circuitry 234 may further translate the subsets of metadata relating to the content access rule data 259 into a consistent data format that the rules engine circuitry 232 is configured to operate on.

The rules engine circuitry 232 is configured to apply content access rule data to content items and/or associated metadata to determine accessibility of content items for transmission to and/or presentation on a mobile platform (e.g., airplane). The determination of accessibility of a content item or group of content items in view of content access rule data, whether based on authorization to view content or other considerations, may be referred to herein as "rules resolution." The rules engine circuitry 232 may be configured to resolve the content access rule data 259 and map the content access rule data to individual media content items, or groupings thereof, of the media content item data 251. The content access rule data 259 may indicate whether individual content access items or groups of content items are accessible to an end user on a mobile platform based on one or more parameters. For example, the content access rules may indicate that a particular content item or group of content items is accessible or inaccessible when one or more mobile platform status parameters have certain value(s). Additionally or alternatively, the content access rule data 259 may indicate particular parameter values associated with content accessibility and/or inaccessibility, either alone or in combination. For example, the content access rules may indicate that content items associated with certain parameter value(s) for a certain parameter type are accessible or inaccessible or should be transferred in the data transfer package to one or more mobile platforms.

As referenced above, the data transfer package generator circuitry 236 may be configured to compile a subset of the media content items 251 for inclusion in a data transfer package 203 intended for a particular mobile platform, or group of mobile platforms. In some embodiments, the data transfer package generator 236 is configured to determine a superset of media content items that may be accessible on the given mobile platform under certain conditions, wherein at any given time, only a subset of the superset of media content items may be accessible for presentation to end-users. That is, the on-ground media server 230 may provide a library of media content items to a mobile platform, wherein the library is potentially larger than the current library of accessible content items for presentation at a given time. Such a packaging of a superset of media content items in the data transfer package 203 may advantageously allow for the mobile platform to implement local rules resolution and provide varying content accessibility across changing conditions. Such local rules resolution may be based at least in part on mobile platform status parameter values, as described herein, which may be accessible on one or more communication busses of the mobile platform. In some embodiments, the content access rule data 259, or at least a subset thereof, and the media content 251 or subset thereof may be synchronized to the mobile platform by the control circuitry 231.

The content access rule data 259 defines access rules for individual content items 258 and/or groups of content items. For example, groups of content items may have similar access rules, and therefore may be resolved collectively in some embodiments. The access rules indicate what content items or groups of content items are authorized or intended for presentation at the mobile platform, or otherwise accessible for presentation by the mobile platform. The access rules may generally relate to one or more parameters (e.g. Param A, Param B) relating to conditions, characteristics, and/or statuses under which a given content item or group of content items is authorized or accessible. The parameters may be content parameters and/or mobile platform status parameters, as described herein. For example, parameters may be associated with one or more of trip destination, trip origin, physical location, mobile platform type, mobile platform passenger demographic, or the like. In some embodiments, at least some of the access rules are not content-item-specific, and rather indicate content parameter values and/or mobile platform status parameter values that are associated with accessible or inaccessible content. For example, the rules engine circuitry 232 may determine a subset of the content items 251 that have content parameter values that indicate accessibility according to the content access rule data and/or mobile platform status parameter values associated with a mobile platform, wherein the data transfer package generator circuitry 236 may be configured to compile such content items in the data transfer package 203 and transmit the data transfer package 203 to the mobile platform.

Parameter data for a given content item, including content parameter-value pair data, may be provided to the on-ground media server 230 as metadata 201 and may be provided from a variety of content sources 240. As described above, content parameters of the parameter data 202 can be content-specific. For example, for a given content item (e.g., Item 1), metadata associated therewith may include one or more parameters (e.g. Param A, Param B, referring to parameter types paired with corresponding parameter values for the content item(s)) relating to accessibility of the content item. The parameter data may include a value for each parameter that is associated with the given content item or group of content items. For example, as referenced above, the metadata 201 may comprise key-value pairs for each parameter and each content item. Generally, as understood by those of ordinary skill in the art, a key-value pair may generally link data items, namely a key or identifier (e.g., a parameter type, such as content title, accessibility start time, etc.) and a value. With respect to embodiments disclosed herein, key-value pairs may be understood to be parameter-value pairs. A set of parameter-value pairs may be assigned for each content item. For example, the metadata 201 may comprise a data structure for each content item, wherein the data structure includes parameter-value pairs for each relevant parameter. As an example, in the context of an airplane mobile platform, metadata may comprise parameter-value pairs for a plurality of content items and/or groupings of content items. For example, the parameters of the metadata may include values for each parameter that indicate accessibility conditions for the respective content item(s). For example, a given content item may have parameter values for one or more of an airplane identifier, flight origin, flight destination, geographic location, or the like, wherein the values associated with the parameters indicate the airplane identifiers, flight origins, flight destinations, and/or geographic locations that correspond to accessibility or inaccessibility of the respective content item(s).

Additional examples of content parameters for content access rules include, but are not limited to, content accessibility/availability start time or date, end time or date, content genre, title, actors, thumbnail graphics, and/or any other parameter(s) or attribute(s) specific to a content item that is desirable to provide to the on-ground media server 230 for the purpose of rules resolution. For example, with respect to advertisement content items, such content items may generally be associated with validity start and end time or date parameters, as well as one or more marketing parameters, such as intended age and/or gender demographic parameters, as well as geography parameters.

The parameter-value pairs may be provided as an array data structure, for example, or may take another suitable or desirable format. In some embodiments, the on-ground media server 230 receives the metadata 201 and parameters 202 in a data package comprising one or more JSON files. In some embodiments, the metadata 201 comprises a JSON file for each respective content item and/or group of content items, including parameters/parameter values related to the respective content items or groups of content items. In some embodiments, the metadata 201 may comprise XML data structure(s), or other similar type of data structure(s).

The adapter circuitry 234 may be configured to implement grouping of metadata and/or media content items, as received from content sources. For example, content items that have similar parameter values with respect to one or more parameters may be identified and grouped such that the rules engine circuitry 232 can apply access rules to the grouped content collectively. In some embodiments, the control circuitry 231, such as the adapter circuitry 234, may utilize metadata for group identification. For example, group description metadata may be used in connection with one or more media content items to identify a group of one or more content items and to allow the rules engine circuitry 232 to apply access rules to media content items associated with such description. Such metadata may be implemented as a parameter-value pair of a data structure, such as a JSON or XML data structure. Grouping functionality may be used to provide a curation of the media content 251 that may simplify application of access rules, as described herein.

As described above, each group identified and/or maintained by the control circuitry 231 may have similar rules resolution across the group. Furthermore, a grouping of content items may include content items of different types, and content items received from different content sources. The data transfer package 203 may include one or more groups of content items comprising content items across content types.

The adapter circuitry 234 is configured to standardize data fields of metadata received from different content sources. For example, the metadata 201 and parameters 202 may be received as part of one or more data structures of one data format, such as a JSON data format, whereas additional metadata and parameters may be received from a separate content source that are of another different data format, such as an XML format, or the like. The adapters 234 may be configured to generate reformatted metadata based on the metadata received from the different content sources, wherein the parameter data is represented in a third, common data format that is different from one or more of the data formats of the received metadata. For example, in one embodiment, the third data format to which the adapters 234 are configured to translate/reformat the received metadata and parameter data may be a simplified data structure, such as a simplified JSON data structure. As an example, the adapters 234 may receive first metadata including first parameter data from a first content source, and re-format the parameter data of the first metadata to a common data format, such as a simplified JSON format/data structure. Further, the adapters 234 may receive second metadata including second parameter data from a second content source separate from the first content source (e.g., physically remote from the first content source). The adapters 234 may reformat the second parameter data of the second metadata to the common data format and may include the second parameter data and the first parameter data together in a single data structure in the common data format.

The on-ground media server 230 may provide a single source for content access rule data and content items. Provision of the content access rule data 259 and media content items 251 as one or more data transfer packages may be achieved through any suitable or desirable mechanism. For example, the data transfer package may be transmitted using a pull methodology, which may leverage media interface circuitry of the mobile platform. Alternatively, a snapshot of the data transfer package may be implemented, wherein the data transfer package is manually installed on the mobile platform (e.g., airplane) at a relatively convenient location, such as in an airplane hangar, or the like. The installation of the snapshot of the data transfer package at the mobile platform may be implemented as a hardware installation, such as the connection of one or more data storage devices or the like. Once downloaded or installed at the mobile platform, the mobile platform may be able to provide access to the media content items with or without connectivity with the on-ground media server 230.

The content access rule data 259 may further include priority parameter data, which may allow for one access rule or grouping of access rules to take precedence over another. The content parameter values associated with a content item may constitute input that is resolved by the rules engine circuitry 232 to determine accessibility. The content access rule data 259 may further include mobile platform status parameters, which may at least partially determine the content items that resolve as accessible at a given point in time. Access rules for content items sourced from different content sources can be combined by the adapter circuitry 234 into a common data format, such as a JSON format, or simplified JSON format. For example, the content items 258 identified in the access rule data 259 may include different types of content together in a single data structure. The on-ground media server 230 may interface with an API of a content source to pull the metadata 201 from the content source, wherein adapter circuitry that is specific to the particular content source may be utilized to parse or otherwise interpret the metadata to reformat the parameter data 202 to a common data format.

With respect to the management of metadata by the on-ground media server 230 from a plurality of distinct content sources, such distinct content sources may utilize different APIs with which the adapters 234 are configured to interface. Such APIs may be utilized by the on-ground media server 230 to request and/or acquire desired metadata from the respective content sources. As the metadata from the various content sources may be received in various data formats, the adapters 234 are advantageously configured to reformat such metadata to a common data format to compile and build the content access rule data 259. The adapters 234 are configured to translate the different packages of metadata to a common data format centrally, such that the parameters thereof can be managed with a singular tool (e.g., rules engine 232).

The on-ground media server 230 further comprises graphical interface data generation circuitry 235, which may be configured to generate graphical interface data for rendering graphical interfaces to allow for configurability of the content access rule data 259, as applicable to one or more content items of the media content 251. Furthermore, the graphical interface data generation circuitry 235 may further be configured to generate data for rendering graphical interfaces for use by mobile platforms in communications with the on-ground media server relating to data transfer packages and/or content access rule data.

The data transfer package generator circuitry 236 may be configured to compile media content items and/or associated content access rule data for a plurality of passenger services for a mobile platform. That is, the data transfer package 203 may comprise different types of media content in a single package. In some embodiments, the data transfer package 203 generated by the data transfer package generator circuitry 236 may comprise a set or collection of media content items and/or content access rules that is designed to be resolved locally on the mobile platform, such that the mobile platform may resolve content access rules locally and determine what content items are accessible to passengers. That is, the data transfer package 203 may comprise a superset of media content items, such that the mobile platform may select among the superset of media content items. To such end, the data transfer package generator circuitry 236 may be configured to apply relatively broader selection criteria for media content items than the mobile platform. The mobile platform may in turn resolve the various current mobile platform status parameter values and/or content parameter values, such as geography, time, route, genre, or the like locally to determine a subset of accessible content items from among the superset of content items contained in the data transfer package 203. In some embodiments, the data transfer package 203 is an update package. That is, the mobile platform may store locally a media content library, wherein the data transfer package 203 comprises an update of media content items to supplement the locally maintained media content library at the mobile platform. The data transfer package 203 may include product catalog content items, such as in-flight connectivity service offerings for a flight, or the like. Content access rules may be applied to such content to determine relevant or desired prices associated with the connectivity services.

Figure 3:
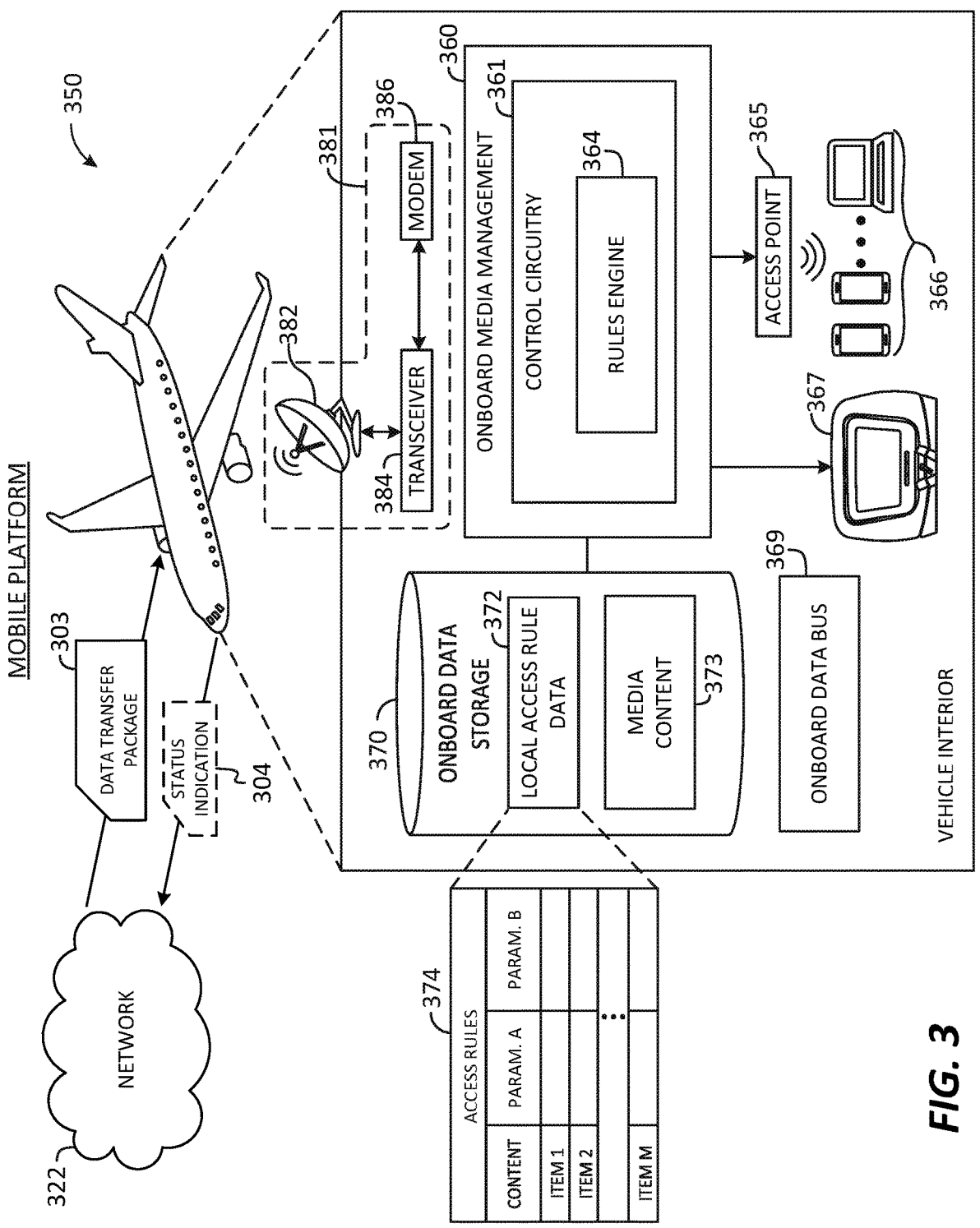
FIG. 3 illustrates an onboard management system in accordance with one or more embodiments.

FIG. 3 illustrates an onboard management system 360 associated with a mobile platform 350 in accordance with one or more embodiments. The onboard media management system 360 may be associated with an onboard media content store 370, which may be configured to store certain media content items 373 as part of a content library. At a given time, the onboard media content library 373 may include both accessible media content items and inaccessible media content items, as described in detail herein. The media content items 373 may comprise any type of media content files or data structures, as well as any type of media, including movies, shows, other types of video files, audio files, news or text content, or the like. Such media content may be viewable by passengers of the mobile platform 150 using various electronic devices, such as vehicle-integrated media presentation devices 367 (e.g., seatback media presentation devices), and/or other electronic devices that may be viewable by passengers. For example, passengers may have personal electronic devices 366 (referred to herein as "PEDs"), which may be configured to connect with the onboard management system 360 in order to receive media therefrom.

The onboard media management server 360 is configured to store local access rule data 372 in the data store 370. The local access rule data 260 may be received at least in part in the data transfer package 303 transmitted from an on-ground server. The local access rule data 372 may comprise content parameters and/or mobile platform status parameters on which local rules resolution by the rules engine circuitry 364 is based. Furthermore, the local access rule data 372 may comprise parameters relating to content items of a variety of types, including, for example, broadcast video or audio content, on-demand movie content, connectivity service offering content, or the like. By storing local access rule data 372 and media content 373 in the data store 370, the mobile platform 350 may be configured to resolve access rules 374 locally at the mobile platform and present authorized/accessible media content to passengers onboard, even in situations where there is no connectivity with the on-ground server. The control circuitry 361 comprises rules engine circuitry 364. The rules engine circuitry 364 is configured to provide local (e.g., off-line) onboard rules resolution using the local access rule data 372, which may advantageously be synchronized with on-ground access rule data maintained by the on-ground server (see FIG. 2).

Local rules resolution functionality, as implemented by the control circuitry 361, may advantageously serve to determine a subset of the media content received in the data transfer package that is accessible onboard the mobile platform 350 at a given time. That is, the data transfer package may comprise a superset of media content items, wherein the rules engine 364 is configured to apply the local access rule data 360 to determine a subset of the superset based on content parameter values and/or mobile platform status parameters.

The mobile platform 350 may comprise a network access terminal 381 for establishing a connection with an external access network, such as a satellite network, cellular network, or other network. The network access terminal 381 comprises one or more of an antenna 382, a transceiver 384, and a modem 386, for facilitating network communications. The antenna 382 may be in communication with the transceiver 384, which may be in communication with the modem 386. The wireless access point 365 may be in communication with the onboard media management system 360 and/or other network access components (not shown). The onboard electronic devices 366, 367 may comprise control circuitry configured to execute one or more applications that provide an interface for users/passengers on the mobile platform 350 to obtain and/or consume media content items of the onboard media content library 373; the user may have the option to select/request one or more media content items from the interface. The network access terminal 381 may provide connectivity between the onboard media manage-ment system 360 and the on-ground media server, e.g., via a satellite and gateway (see FIG. 1).

For convenience, the following description refers to the mobile platform 350 as a vehicle, such as an airplane. The electronic devices 366, 367 disposed within the vehicle 350 can include any type of personal electronic devices (e.g., smartphones, laptops, tablets, netbooks, and the like) brought onto the vehicle 350 by passengers, as well as passenger seat back systems 367 or other devices on the vehicle 350. The electronic devices 366, 367 can be con-figured to communicate with the onboard media manage-ment system 360 via a communication link that can be wired and/or wireless. The communication link can be, for example, part of a local area network, such as a wireless local area network (WLAN) supported by the wireless access point (WAP) 365. One or more access points 365 can be distributed about the vehicle 350, and can, in conjunction with the media management system 360, provide traffic switching and routing functionality; for example, as part of a WLAN extended service set (ESS), etc.

Passengers on the vehicle may interface with the onboard media management system 360 in any suitable or desirable way. For example, media content may be presented to passengers using electronic displays of personal electronic devices 366 associated with the passengers, such as through a web browser application, native application, or the like, or using an interface associated with a vehicle-integrated media system, such as the seatback media system 367. The onboard media management system 360 may serve as a media delivery system and/or content server for providing media content for presentation using the personal electronic devices (e.g., PED 166) and/or presentation systems asso-ciated with the vehicle 350 (e.g., seatback media presenta-tion devices or systems 362).

The onboard data store 370 comprises nonvolatile data storage media. Such data storage media may include any type or amount of data storage, including magnetic media, optical media, solid-state media, and/or the like. The media content 373 comprises the current media content items stored in the content delivery system of the vehicle 350. The onboard data store 370 may store the access rule data 372, which may comprise data indicating content distribution rights and/or other content access parameters for the media content 373, including content-specific parameter values and/or mobile platform parameters. For example, the access rules 374 embodied in the access rule data 372 may define media content distribution regions and/or windows of time within which the media content items 373 may or may not be accessible to passengers. The access rule data 372 may be stored in one or more tables, or any other type of data structure(s).

The access rule data 372 may be defined in any suitable or desirable way. For example, access rules/parameters may be based on user information associated with the user requesting a media content item. Such user information may be related to the carrier (e.g., airline) or provider of the media content. As yet another example, the access rules 360 may include rules specific to a particular vehicle (e.g., a particular aircraft) and/or the origin and/or destination of the vehicle.

The onboard media management server 360 comprises control circuitry 361 for implementing functionality in accordance with embodiments of the present disclosure. The mobile platform 350 receives the data transfer package 303, such as over the network 322 from an on-ground media server (not shown). Alternatively, the data transfer package 303 may be manually installed in the mobile platform 350, such as through a hardware swap or installation. The data transfer package 303 includes content items for the media content library 373, as well as access rule data maintained at the remote on-ground server. The media management server 360 may store the local access rule data in the onboard data storage 370, as well as the media content items 373.

The onboard management server 360 further comprises local rules engine circuitry 364. The rules engine circuitry 364 is configured to resolve the local access rule data 372 dependent on certain mobile platform status parameter val-ues associated with the mobile platform 350, wherein such mobile platform status parameters relate to the local access rule data 372. That is, the local access rule data may comprise mobile platform status parameters and mobile platform status parameter value pair associated with media content accessibility. The control circuitry 361 may be configured to determine or receive current mobile platform status values for the mobile platform from one or more onboard data busses 369. For example, with respect to an airplane mobile platform embodiment, certain types of con-tent items, such as broadcast video content items, may not be authorized or accessible in certain geographic areas. There-fore, the rules engine circuitry 364 may be configured to determine a position attribute or status of the mobile plat-form 350 using the onboard data bus 369 and utilize such attribute/status as a parameter in resolving media content access rules for one or more content items.

As an example implementation, the control circuitry 361 may receive the data transfer package 303, which comprises a superset of media content items. The rules engine circuitry 364 of the control circuitry 361 may further access the local access rule data 360 maintained in the onboard data storage 370, the local access rule data comprising one or more mobile platform status parameters (e.g., mobile platform status parameter-value pairs). The mobile platform status parameters may be maintained in the onboard data storage prior to receipt of the data transfer package 303 or may be received at least in part as part of the data transfer package 303. The mobile platform status parameters may indicate that a subset of the media content items received in the data transfer package 303 and/or previously stored in the media content 373 in the onboard data storage 370 that is associated with certain mobile platform status parameter values is accessible at the current time. For example, the mobile platform status parameters may indicate that for a current mobile platform position (e.g., according to a posi-tion mobile platform status parameter/value), altitude, speed, bandwidth, content consumption, user input/selec-tion, or other status parameter, a subset of content items is accessible. The mobile platform status parameters may for example be used by the control circuitry 361 to ensure compliance with content distribution rights. In such a case, the control circuitry 361 may use one or more of the mobile status parameters (e.g., current position, origin, destination, etc.) to limit accessibility to the subset of media content items that are currently allowed for distribution on the mobile platform. As another example, the control circuitry

361 may use one or more mobile status parameters (e.g., current position, origin, destination, etc.) to provide the subset of media content items that may be most relevant to passengers.

The control circuitry may be further configured to receive current mobile platform status data from the onboard data bus 369, which may be an aircraft data bus in some embodiments. The control circuitry 260 and/or rules engine circuitry 364 may be configured to apply the current mobile platform status data from the onboard data bus 369 to the local access rule data 372 to determine the current subset of the media content 373 that is accessible onboard the mobile platform.

Such onboard rules resolution by the rules engine circuitry 364 may be implemented independent of connectivity with an on-ground remote server. The status/attribute(s) of the mobile platform 350 may determine certain aspects of media content presentation on the devices 366, 367, such as graphical interface data, including what media content items are presented as available/accessible for viewing or consumption, service prices, or the like. Examples of status or attributes of a mobile platform include but are not limited to trip origin, trip destination, geolocation data, current time, vehicle identifier information, and/or other attribute(s).

In some embodiments, the mobile platform 350 (e.g., the control circuitry 361) is configured to transfer status indication data 304 to an on-ground server (not shown; see FIG. 2) over the network 322. The communication of the status indication through for and/or data transfer package 303 between the mobile platform 350 and the remote on-ground server can allow for at least partially automatic and/or on-demand synchronization of content access rule data and/or media content between the on-ground server and the mobile platform 350. Such transmissions may occur over a satellite or other over-the-air communication technology. The control circuitry 361 and/or rules engine circuitry 364, as referenced above, can be configured to determine status or attributes relating to the mobile platform 350. Such status information may be provided to the remote on-ground server as the status indication 304 under certain conditions. For example, when a status or attribute of the mobile platform 350 changes, such as a location thereof, the control circuitry 361 and/or rules engine circuitry 364 may be configured to automatically transmit the status indication 304 indicating the change of status. Additionally or alternatively, the status indication 304 may be provided by the mobile platform 350 over the network 322 periodically, or on demand.

Local rules resolution functionality, as implemented by the control circuitry 361, may advantageously serve to determine a subset of the media content received in the data transfer package that is accessible onboard the mobile platform 350 at a given time. That is, the data transfer package may comprise a superset of media content items, wherein the rules engine 364 is configured to apply the local access rule data 360 to determine a subset of the superset based on content parameter values and/or mobile platform status parameters.

The control circuitry 361 may be configured to configure graphical user interface data for presentation to the devices 366, 367 according to the rules resolution executed by the rules engine circuitry 364. The rules engine circuitry 364 is configured to apply the local access rule data 372 to the media content items 373 to determine a subset of the media content items 373 that is authorized or accessible for presentation and may provide access to such content to passengers onboard the vehicle 350.

When updates to the local access rule data 372 are necessary or desired, embodiments the present disclosure may allow for synchronization of the access rule data 372 with remotely maintained access rule data at an on-ground media server. The onboard media management server 360 may periodically, or in response to an event or condition, initiate a request for synchronization or updating of the local access rule data 372 and/or media content 373. Alternatively, the on-ground server may initiate the updating of the local access rule data 372 and/or media content 373, such as in response to a change in the on-ground access rule data and/or media content library. Access rule data and/or media content updates may be based at least in part on the timing in which a previous update or transmission occurred. That is, after a predetermined period of time from a previous update or installation, an update package may be requested or provided as a matter of course. Such updating of the local access rule data 372 and/or media content 373 may occur substantially automatically and/or as a background operation of the onboard media management server 360. Updating of the local access rule data 372 and/or media content 373 may advantageously be performed at a convenient time and location, such as when the vehicle is parked and/or not currently hosting passengers thereon. The data transfer package 303, whether an initial transfer package or an update transfer package, may occur over a satellite network connection, such as while an airplane is in flight, or may occur over a Wi-Fi or other wireless protocol connection. In some embodiments, a low-priority multicast of the data transfer package may be implemented over a satellite communication. For example, a plurality of airplanes concurrently located at the same airport can receive the same in transfer package in a satellite beam covering the airport.

The transfer of the data transfer package 303 during travel, such as in-flight with respect to aircraft embodiments, may advantageously involve the transmission of the data transfer package 303 over the same communication link (e.g., satellite network connection) used to concurrently provide onboard media service to passengers. For example, the control circuitry 361 may be configured to provide media streaming to the media presentation devices 366, 367 (e.g., personal electronic devices) using a satellite network connection during travel, as well as receive the data transfer package 303 over the same satellite network connection and provide onboard media management in connection with the same during the same travel period.

Media Content Transfer/Management Processes

Figure 4:
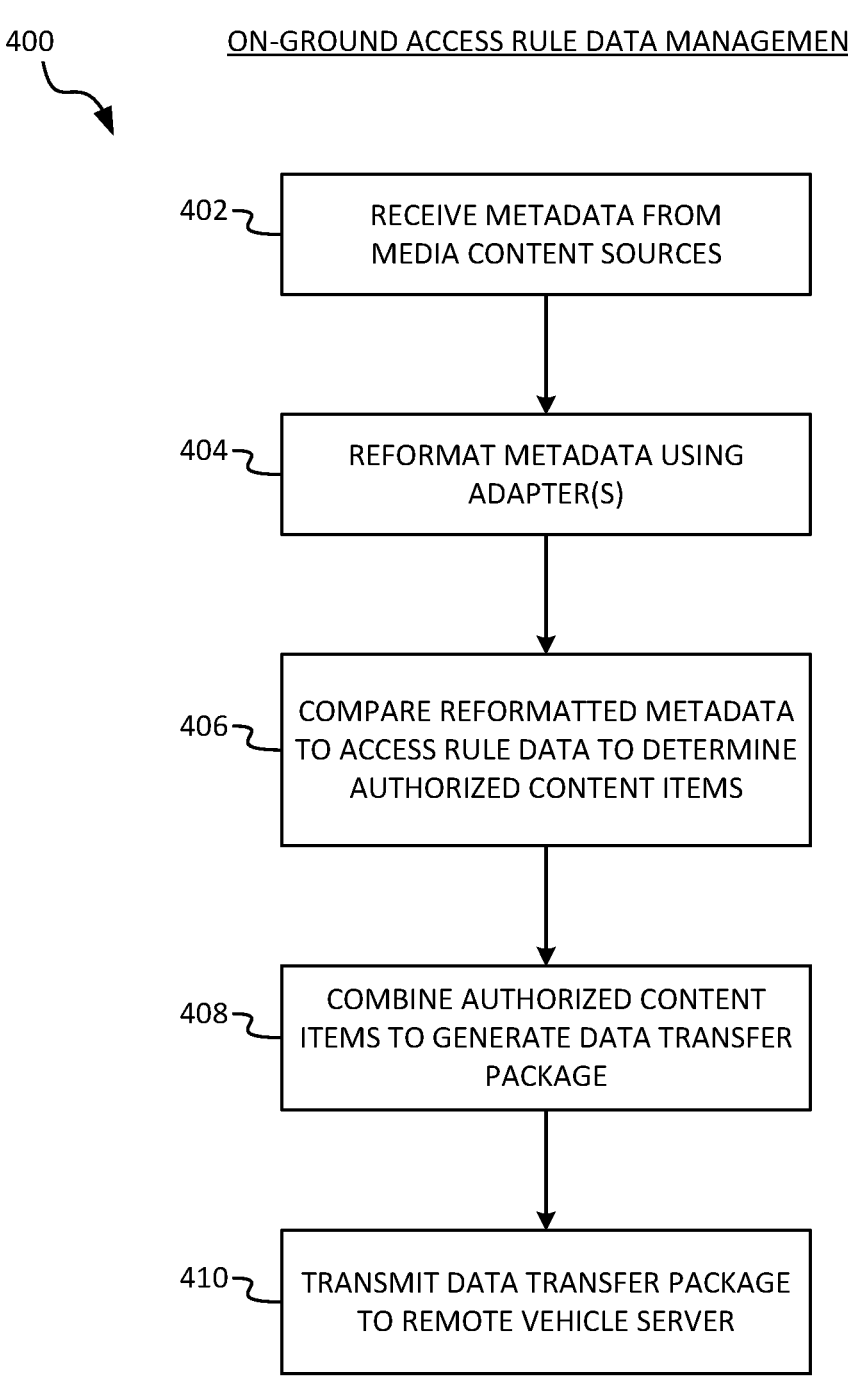
FIG. 4 illustrates a process for managing access rule data in accordance with one or more embodiments.

FIG. 4 illustrates a process 400 for on-ground access rule data management in accordance with embodiments the present disclosure. The process 400 involves, at block 402, receiving metadata from a plurality of media content sources. The metadata may include content specific parameters indicating attributes of the respective content items and/or mobile platform status parameter values for which content items are accessible or inaccessible.

At block 404, the process 400 involves reformatting the metadata received from the various media content sources into a common data format using a plurality of source-specific adapters (e.g., adapter circuitry). At block 406, the process 400 involves comparing the reformatted metadata to access rule data to determine authorized content items for one or more mobile platforms, such as one or more, or the like. At block 408, the process 400 involves combining the authorized content items to generate a data transfer package for the one or more mobile platforms. At block 410, the process 400 involves transmitting the data transfer package to a remote server of the vehicle.

Figure 5:
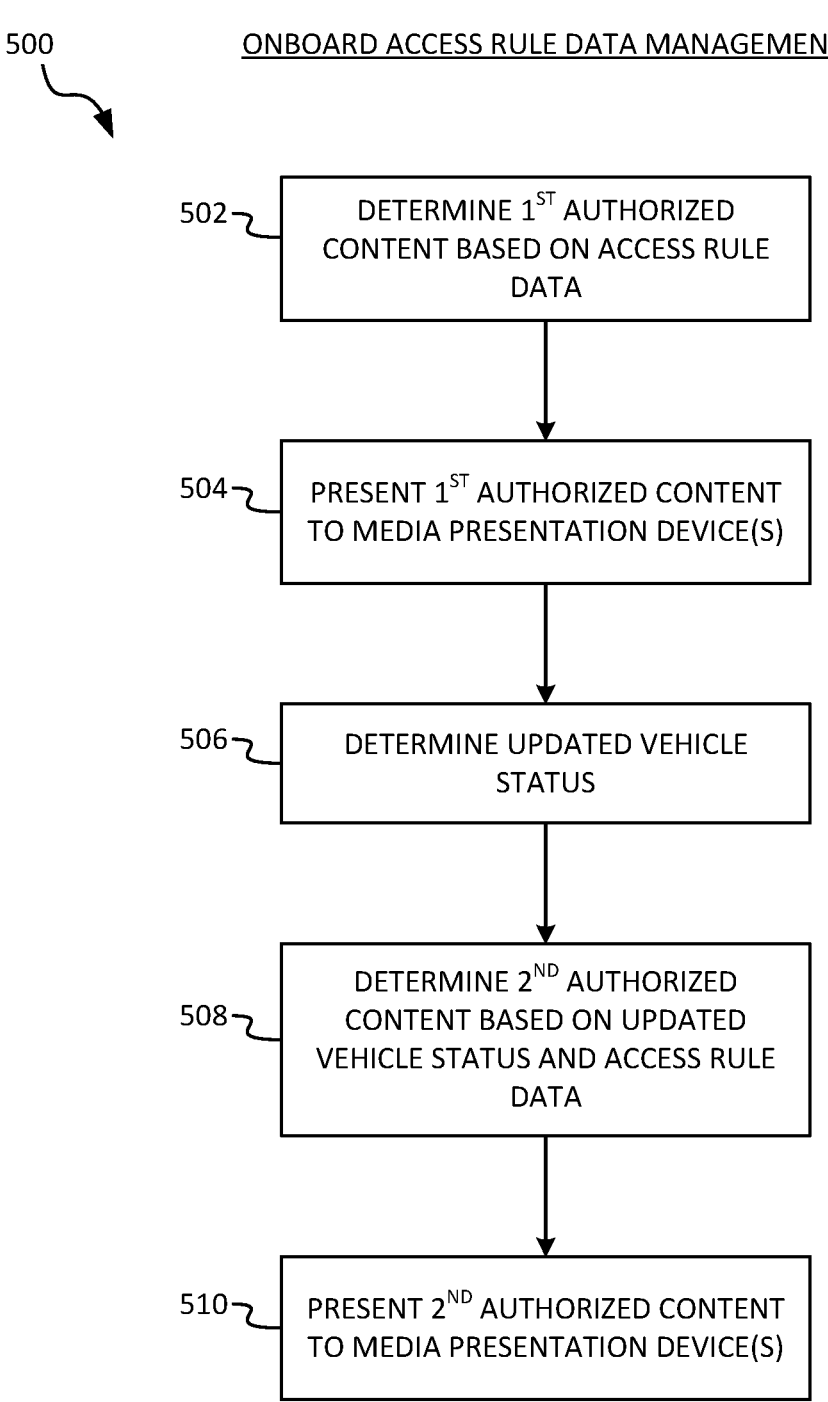
FIG. 5 illustrates a process for managing access rule data in accordance with one or more embodiments.

FIG. 5 illustrates a process 500 for onboard access rule data management onboard a vehicle or other mobile platform according to one or more embodiments of the present disclosure. At block 502, the process 500 involves determining a first set of authorized media content items based on locally maintained access rule data at the vehicle or other mobile platform. At block 504, the process 500 involves presenting the first set of authorized media content to media presentation devices disposed onboard the vehicle. For example, the media content items may be presented using one or more seatback media presentation devices and/or mobile devices brought onboard the vehicle by passengers or crew members.

At block 506, the process 500 involves determining an updated vehicle status of the vehicle or other mobile platform. For example, the vehicle status update may relate to a change in physical position or orientation of the vehicle, a present time, a destination or origin of the vehicle, or other attribute or status of the vehicle. At block 508, the process 500 involves determining a second set of authorized media content based on the locally maintained access rule data and the updated vehicle status. For example, the new vehicle status may be associated with access to a different set of media content items that may not be wholly the same as the first set of authorized media content items. At block 510, the process 500 involves presenting the second set of authorized media content to media presentation devices onboard a vehicle.

General Comments

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

Reference throughout this disclosure to "some embodiments," "certain embodiments," or "an embodiment" means that a particular feature, structure or characteristic described in connection with the embodiment can be included in at least some embodiments. Thus, appearances of the phrases "in some embodiments," "in certain embodiment," or "in an embodiment" in various places throughout this specification are not necessarily all referring to the same embodiment, and may refer to one or more of the same or different embodiments. Furthermore, embodiments disclosed herein may or may not be embodiments of the invention. For example, embodiments disclosed herein may, in part or in whole, include non-inventive features and/or components. In addition, the particular features, structures or characteristics can be combined in any suitable manner, as would be apparent to one of ordinary skill in the art from this disclosure, in one or more embodiments.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Methods and processes described herein may be embodied in, and partially or fully automated via, software code modules executed by one or more general and/or special purpose computers. The word "module" may refer to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). "Module" may further refer to one or more devices, components, systems, or subsystems, which may conceptually implement relevant functionality. It will be further appreciated that hardware modules may be comprised of connected logic units, such as gates and flip-flops, and/or may be comprised of programmable units, such as programmable gate arrays, application specific integrated circuits, and/or processors. The modules described herein are preferably implemented as software modules but may be represented in hardware and/or firmware. Moreover, although in some embodiments a module may be separately compiled, in other embodiments a module may represent a subset of instructions of a separately compiled program, and may not have an interface available to other logical program units.

What is claimed is:

1. A content presentation system for a vehicle, the content presentation system comprising:

non-volatile data storage media configured to store a media content library and content access rule data, wherein the content access rule data applies one or more restrictions to the media content library based on one or more mobile platform status parameters associated with the vehicle, and wherein each of the one or more mobile platform status parameters comprises a respective parameter type and a respective parameter value;

a network interface; and an onboard media management server, the onboard media management server comprising control circuitry configured to:

determine a first subset of the media content library that is authorized for presentation based on the content access rule data and a status associated with the vehicle;

present the first subset of the media content library to one or more media presentation devices disposed onboard the vehicle;

determine an updated status associated with the vehicle based on a change to at least one parameter value corresponding to at least one of the one or more mobile platform status parameters, wherein the status and the updated status are associated with a same parameter type corresponding to the at least one of the one or more mobile platform status parameters;

in response to the updated status, determine a second subset of the media content library that is authorized for presentation based on the content access rule data and the updated status, the second subset of the media content library being different, at least in part, from the first subset of the media content library; and present the second subset of the media content library to the one or more media presentation devices.

2. The system of claim 1, wherein said determining the second subset of the media content library is performed off-line.

3. The system of claim 1, wherein:

the control circuitry is further configured to, in response to the updated status:

establish a connection with a remote server using the network interface;

receive updated content access rule data from the remote server using the network interface; and store the updated content access rule data in the non-volatile data storage media; and the second subset of the media content library is based at least in part on the updated content access rule data.

4. The system of claim 1, wherein:

the control circuitry is further configured to, in response to the updated status:

establish a connection with a remote server using the network interface;

receive updated media content from the remote server using the network interface; and store the updated media content in the non-volatile data storage media as part of the media content library; and the second subset of the media content library comprises at least a portion of the updated media content.

5. The system of claim 1, wherein:

the control circuitry is further configured to generate portal graphical interface data representing the second subset of the media content library; and said presenting the second subset of the media content library comprises providing the portal graphical interface data to the one or more media presentation devices.

6. The system of claim 1, wherein:

the content access rule data indicates one or more parameters associated with each of a plurality of content items; and the updated status is associated with the one or more parameters.

7. The system of claim 1, wherein the media content library includes content items for a plurality of different content types.

8. The system of claim 1, wherein each of the first subset and the second subset comprise one or more of the following:

on-demand video content;

broadcast television content; or advertisement content.

9. The system of claim 1, wherein:

the network interface is further configured to:

transmit status indication data to a remote server; and receive the content access rule data and media content based at least in part on a value of the status indication data.

10. The system of claim 9, wherein the status indication data is automatically transmitted based on a change of the value of the status indication data.

11. A method for content presentation in a vehicle comprising:

determining a first subset of a media content library that is authorized for presentation based on content access rule data and a status associated with the vehicle, wherein the content access rule data applies one or more restrictions to the media content library based on one or more mobile platform status parameters associated with the vehicle, and wherein each of the one or more mobile platform status parameters comprises a respective parameter type and a respective parameter value;

presenting the first subset of the media content library to one or more media presentation devices disposed onboard the vehicle;

determining an updated status associated with the vehicle based on a change to at least one parameter value corresponding to at least one of the one or more mobile platform status parameters, wherein the status and the updated status are associated with a same parameter type corresponding to the at least one of the one or more mobile platform status parameters;

in response to the updated status, determining a second subset of the media content library that is authorized for presentation based on the content access rule data and the updated status, the second subset of the media content library being different, at least in part, from the first subset of the media content library; and presenting the second subset of the media content library to the one or more media presentation devices.

12. The method of claim 11, wherein said determining the second subset of the media content library is performed off-line.

13. The method of claim 11, further comprising:

establishing a connection with a remote server using a network interface;

receiving updated content access rule data from the remote server using the network interface; and storing the updated content access rule data in non-volatile data storage media, wherein the second subset of the media content library is based at least in part on the updated content access rule data.

14. The method of claim 11, further comprising:

establishing a connection with a remote server using a network interface;

receiving updated media content from the remote server using the network interface; and storing the updated media content in non-volatile data storage media as part of the media content library, wherein the second subset of the media content library comprises at least a portion of the updated media content.

15. The method of claim 11, further comprising:

generating portal graphical interface data representing the second subset of the media content library; and said presenting the second subset of the media content library comprises providing the portal graphical interface data to the one or more media presentation devices.

16. The method of claim 11, wherein:

the content access rule data indicates one or more parameters associated with each of a plurality of content items; and the updated status is associated with the one or more parameters.

17. The method of claim 11, wherein the media content library includes content items for a plurality of different content types.

18. The method of claim 11, wherein each of the first subset and the second subset comprise one or more of the following:

on-demand video content;

broadcast television content; or advertisement content.

19. The method of claim 11, further comprising:

transmitting status indication data to a remote server; and receiving the content access rule data and media content based at least in part on a value of the status indication data.

20. The method of claim 19, wherein the status indication data is automatically transmitted based on a change of the value of the status indication data.

* * * * *